(12) United States Patent
Partridge et al.

(10) Patent No.: US 9,753,906 B2
(45) Date of Patent: *Sep. 5, 2017

(54) CHARACTER STRING REPLACEMENT

(71) Applicant: Google Inc., Mountain View, CA (US)

(72) Inventors: Kurt Edward Partridge, Palo Alto, CA (US); Yu Ouyang, San Jose, CA (US)

(73) Assignee: Google Inc., Mountain View, CA (US)

( * ) Notice: Subject to any disclaimer, the term of this patent is extended or adjusted under 35 U.S.C. 154(b) by 662 days.

This patent is subject to a terminal disclaimer.

(21) Appl. No.: 14/296,090

(22) Filed: Jun. 4, 2014

(65) Prior Publication Data

US 2014/0289618 A1    Sep. 25, 2014

Related U.S. Application Data

(63) Continuation of application No. 13/781,461, filed on Feb. 28, 2013, now Pat. No. 8,782,550.

(51) Int. Cl.
*G06F 3/048*  (2013.01)
*G06F 17/24*  (2006.01)
(Continued)

(52) U.S. Cl.
CPC .............. *G06F 17/24* (2013.01); *G06F 3/017* (2013.01); *G06F 3/0488* (2013.01); *G06F 3/04886* (2013.01); *G06F 17/276* (2013.01)

(58) Field of Classification Search
CPC ........ G06F 17/24; G06F 3/017; G06F 3/0488; G06F 3/04886
See application file for complete search history.

(56) References Cited

U.S. PATENT DOCUMENTS 6,286,064 B1   9/2001   King et al.
6,292,179 B1   9/2001   Lee
(Continued)

FOREIGN PATENT DOCUMENTS

CN   101506867 A   8/2009
CN   102141889 A   8/2011
(Continued)

OTHER PUBLICATIONS

Office Action from counterpart Korean Patent Application No. 10-2014-0024228, dated Jul. 10, 2014, 9 pp.
(Continued)

*Primary Examiner* — Omar Abdul-Ali
(74) *Attorney, Agent, or Firm* — Shumaker & Sieffert, P.A.

(57) ABSTRACT

In one example, a method includes outputting, for display at a presence-sensitive display, a graphical user interface including a text display region and a graphical keyboard. The method further includes receiving an indication of a first gesture detected at a location within the text display region, and selecting, based at least in part on the location within the text display region, at least a portion of a character string included in the text display region. The method further includes receiving, while the first gesture is detected at the presence-sensitive display, an indication of at least a portion of a second gesture to select at least one key of the graphical keyboard, and outputting, responsive to receiving an indication of a termination of at least the second gesture, a replacement character string for display within the text display region to replace the portion of the character string.

20 Claims, 6 Drawing Sheets

(51) Int. Cl.
  *G06F 3/0488* (2013.01)
  *G06F 17/27* (2006.01)
  *G06F 3/01* (2006.01)

(56) References Cited

U.S. PATENT DOCUMENTS

| | | | |
|---|---|---|---|
| 6,801,190 | B1 | 10/2004 | Robinson et al. |
| 7,030,863 | B2 | 4/2006 | Longe et al. |
| 7,042,443 | B2 | 5/2006 | Woodard et al. |
| 7,075,520 | B2 | 7/2006 | Williams |
| 7,088,345 | B2 | 8/2006 | Robinson et al. |
| 7,098,896 | B2 | 8/2006 | Kushler et al. |
| 7,145,554 | B2 | 12/2006 | Bachmann |
| 7,151,530 | B2 | 12/2006 | Roeber et al. |
| 7,199,786 | B2 | 4/2007 | Suraqui |
| 7,250,938 | B2 | 7/2007 | Kirkland et al. |
| 7,251,367 | B2 | 7/2007 | Zhai |
| 7,277,088 | B2 | 10/2007 | Robinson et al. |
| 7,453,439 | B1 | 11/2008 | Kushler et al. |
| 7,508,324 | B2 | 3/2009 | Suraqui |
| 7,706,616 | B2 | 4/2010 | Kristensson et al. |
| 7,716,579 | B2 | 5/2010 | Gunn et al. |
| 7,750,891 | B2 | 7/2010 | Stephanick et al. |
| 7,920,132 | B2 | 4/2011 | Longe et al. |
| 7,921,361 | B2 | 4/2011 | Gunn et al. |
| 8,036,878 | B2 | 10/2011 | Assadollahi |
| 8,060,841 | B2 | 11/2011 | Boillot et al. |
| 8,074,172 | B2 | 12/2011 | Kocienda et al. |
| RE43,082 | E | 1/2012 | Gutowitz |
| 8,135,582 | B2 | 3/2012 | Suraqui |
| 8,179,370 | B1 | 5/2012 | Yamasani et al. |
| 8,359,543 | B2 | 1/2013 | Sengupta |
| 8,782,550 | B1 | 7/2014 | Patridge et al. |
| 2006/0052885 | A1 | 3/2006 | Kong |
| 2006/0119582 | A1 | 6/2006 | Ng et al. |
| 2006/0176283 | A1 | 8/2006 | Suraqui |
| 2008/0316183 | A1 | 12/2008 | Westerman et al. |
| 2008/0316212 | A1 | 12/2008 | Kushler |
| 2009/0077464 | A1 | 3/2009 | Goldsmith et al. |
| 2009/0167700 | A1 | 7/2009 | Westerman et al. |
| 2009/0228842 | A1 | 9/2009 | Westerman et al. |
| 2010/0287486 | A1 | 11/2010 | Coddington |
| 2011/0202836 | A1 | 8/2011 | Badger et al. |
| 2012/0036469 | A1 | 2/2012 | Suraqui |
| 2012/0054671 | A1 | 3/2012 | Thompson et al. |
| 2012/0079373 | A1 | 3/2012 | Kocienda et al. |
| 2013/0125037 | A1 | 5/2013 | Pasquero et al. |

FOREIGN PATENT DOCUMENTS

| | | |
|---|---|---|
| EP | 1475689 A2 | 11/2004 |
| EP | 2098947 A3 | 3/2009 |
| KR | 1020040094305 A | 11/2004 |
| KR | 20110096524 A | 8/2011 |
| KR | 101187475 B1 | 10/2012 |
| WO | 2012166975 A2 | 12/2012 |

OTHER PUBLICATIONS

Office Action from counterpart Great Britain Application No. 1519660.3, dated Jul. 27, 2016, 2 pp.

First Office Action and Search Report, and translation thereof, from counterpart Chinese Application No. 201410073286.6, dated Jul. 25, 2016, 29 pp.

Response to the Communication dated Jul. 27, 2016, from counterpart Great Britain Application No. 1519660.3, filed Aug. 23, 2016, 7 pp.

Examination and Search Report from counterpart Great Britain Application No. 1519660.3, dated Sep. 19, 2016, 4 pp.

Baldwin et al., "Autonomous Self-Assessment of Autocorrections: Exploring Text Message Dialogues", 2012 Conference of the North American Chapter of the Association for Computational Linguistics: Human Language Technologies, Jun. 3-8, 2012, pp. 710-719.

"How can we improve SwiftKey", SwiftKey, Aug. 9, 2012, retrieved from the Internet: ,http://supports.swiftkey.net/forums/116689-1-swiftkey-ideas-/suggestions/3064338-a-gesture-to-re-place-an-auto-mis-corrected-word-w> 2 pgs.

"A quick description of 'Gestural recognition', autocorre, etc." LEAP, Jun. 15, 2012. Retrieved from the Internet: <https://forums.leapmotion.com/showthread.php?124-A-quick-description-pf-quot-Gestural-recognition-quot-autocorrect-etc&p=383&viewfull=1>3 pgs.

"Bug 764297—MacOS Lion's auto-correct ("long press") keyboard feature not supported", Bugzilla, Jun. 13, 2012. Retrieved from the Internet: <https://bugzilla.mozilla.org/show_bug.cgi?id=764297> 1 pg.

Burns, "nuance Supercharges Swype, Adds New Keyboard Options, XT9 Predictive Text, and Dragon-Powered Voice Input", TechCrunch, Jun. 20, 2012. Retrieved from the Internet: <http://techcrunch.com/2012/06/20/nuance-supercharges-swype-adds-new-keyboard-options-xt9-predictive-text-and-dragon-powered-voice-input/> 3 pgs.

Butcher, "SwiftKey Counters Swype With a Smarter Version, Makes an In-Road Into Healthcare Market", TechCrunch, Jun. 21, 2012. Retrieved from the Internet: <http://techcrunch.com/2012/06/21/swiftkey-counters-swype-with-a-smarter-version-makes-an-in-road-into-healthcare-market/> 2 pgs.

Zhai et al., "Shorthand Writing on Stylus Keyboard", 2003, Proceeding of the SIGCHI Conference on Human Factors in Computing System, pp. 97-104.

Great Britain Search Report from Great Britain Application No. GB1403525.7, dated Apr. 14, 2014, 5 pp.

U.S. Appl. No. 60/430,338, by Daniel Suraqui, filed Nov. 29, 2002.

U.S. Appl. No. 60/505,724, by Daniel Suraqui, filed Sep. 22, 2002.

Response to the Section 17 and 18(3) Communication dated Sep. 19, 2016, from counterpart British Application No. 1519660.3, filed Mar. 2, 2017, 7 pp.

Notification on the Grant of Patent Right for Invention, and translation thereof, from counterpart Chinese Application No. 201410073286.6, issued Mar. 17, 2017 3 pgs.

CHARACTER STRING REPLACEMENT

RELATED APPLICATION

This application is a continuation of U.S. application Ser. No. 13/781,461, filed Feb. 28, 2013.

BACKGROUND

Some computing devices (e.g., mobile phones, tablet computers, etc.) may provide a graphical keyboard as part of a graphical user interface for inputting text using a presence-sensitive display (e.g., a screen). The graphical keyboard may enable a user of the computing device to enter text (e.g., for an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

A graphical keyboard may enable a user to delete and/or replace one or more portions of text. For instance, in some examples, a user may repeatedly select a backspace key or delete key included in the graphical keyboard to delete characters of text. Certain techniques may enable a user to select a portion of text (e.g., a word) and enter replacement text by providing gesture input at or near the graphical keyboard. However, in such examples, a user may experience difficulty precisely selecting the portion of text when the text is small in size relative to the input medium of a user (e.g., relative to the size of a user's finger). Moreover, using such techniques, a user may typically have to provide additional input (e.g., subsequent touch input) to the computing device to reposition a cursor or carat prior to inserting additional text at the end of a sentence. As such, deleting and/or replacing characters when using a graphical keyboard may be difficult and may reduce the speed at which the user may interact with the computing device.

SUMMARY

In one example, a method includes outputting, by a computing device and for display at a presence-sensitive display, a graphical user interface including a text display region and a graphical keyboard, and receiving, by the computing device, an indication of a first gesture detected at the presence-sensitive display at a location within the text display region. The method further includes selecting, by the computing device and based at least in part on the location within the text display region, at least a portion of the character string, receiving, by the computing device and while the first gesture is detected at the presence-sensitive display, an indication of at least a portion of a second gesture to select at least one key of the graphical keyboard, and outputting, by the computing device and responsive to receiving an indication of a termination of at least the second gesture, a replacement character string for display within the text display region to replace the portion of the character string. The replacement character string may be based at least in part on the at least one key.

In another example, a computer-readable storage medium is encoded with instructions that, when executed, cause at least one processor of a computing device to output, for display at a presence-sensitive display, a graphical user interface including a text display region and a graphical keyboard, receive an indication of a first gesture detected at the presence-sensitive display at a location within the text display region, and select, based at least in part on the location within the text display region, at least a portion of the character string. The computer-readable storage medium is further encoded with instructions that, when executed, cause the at least one processor of the computing device to receive, while the first gesture is detected at the presence-sensitive display, an indication of at least a portion of a second gesture to select at least one key of the graphical keyboard, and output, responsive to receiving an indication of a termination of at least the second gesture, a replacement character string for display within the text display region to replace the portion of the character string, wherein the replacement character string is based at least in part on the at least one key.

In another example, a device includes at least one processor, a presence-sensitive display, and at least one module operable by the at least one processor to output, for display at the presence-sensitive display, a graphical user interface including a text display region and a graphical keyboard, receive an indication of a first gesture detected at the presence-sensitive display at a location within the text display region, and select, based at least in part on the location within the text display region, at least a portion of the character string. The at least one module is further operable by the at least one processor to receive, while the first gesture is detected at the presence-sensitive display, an indication of at least a portion of a second gesture to select at least one key of the graphical keyboard, and output, responsive to receiving an indication of a termination of at least the second gesture, a replacement character string for display within the text display region to replace the portion of the character string, wherein the replacement character string is based at least in part on the at least one key.

The details of one or more examples of the disclosure are set forth in the accompanying drawings and the description below. Other features, objects, and advantages will be apparent from the description and drawings, and from the claims.

DETAILED DESCRIPTION

Figure 1:
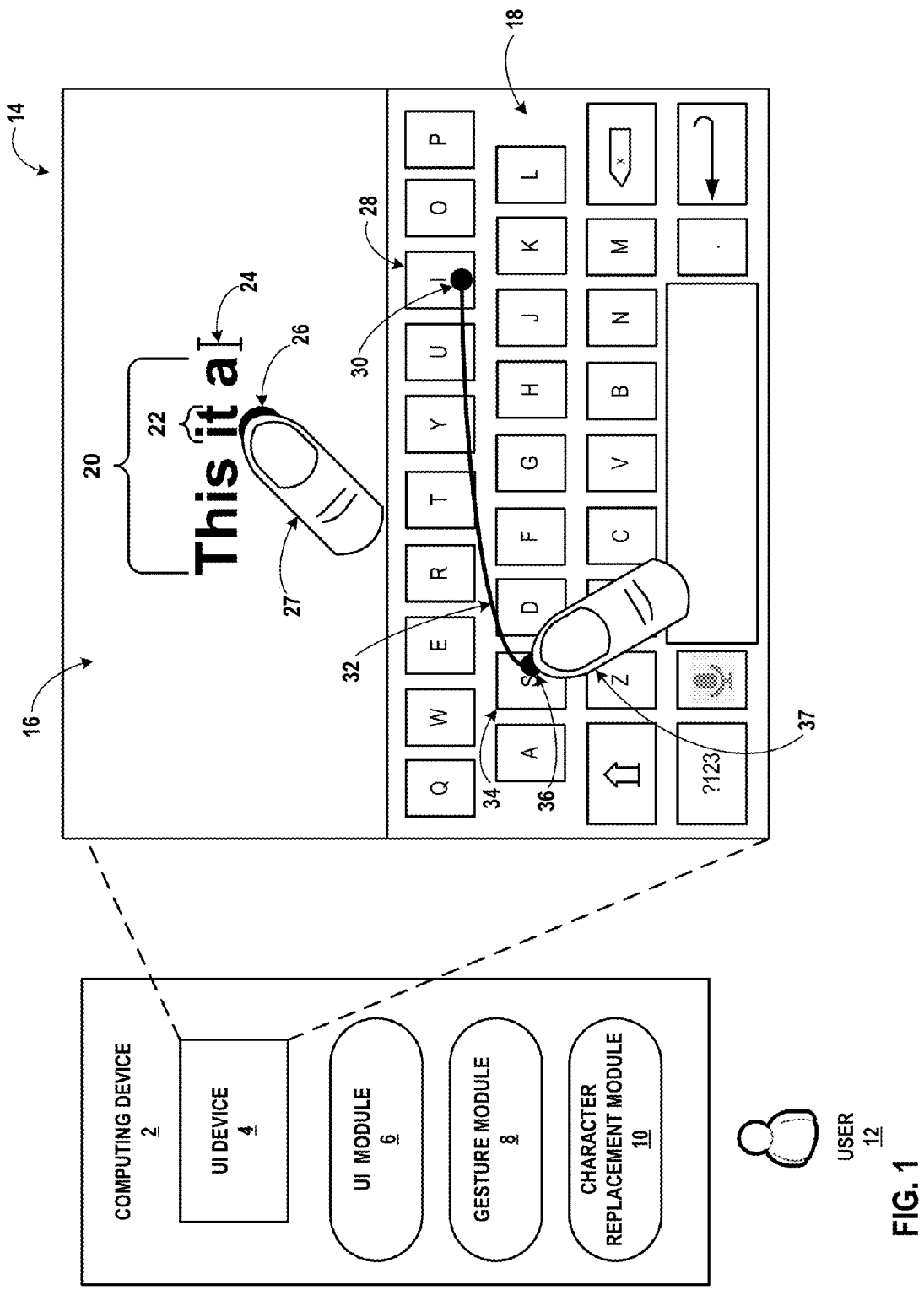
FIG. 1 is a block diagram illustrating an example computing device that may be used to output a replacement character string to replace at least a portion of a displayed character string, in accordance with one or more techniques of this disclosure.

In general, this disclosure is directed to techniques for outputting a replacement character string to replace at least a portion of a displayed character string. In some examples, a presence-sensitive display that displays a graphical keyboard may also detect gestures. The presence-sensitive display (e.g., a touch-sensitive screen) may enable a user to input text by detecting user inputs in the form of gestures performed at or near the presence-sensitive display. In certain examples, a user may enter a string of text, for example a word, by performing one or more gestures at or near the presence-sensitive display. For instance, a user may perform one or more touch gestures at or near the presence-sensitive display to sequentially select one or more characters associated with keys of a graphical keyboard.

Conventionally, a user may delete one or more of the characters by performing one or more gestures at or near the presence-sensitive display. For instance, a user may repeatedly select a backspace key or delete key included in a graphical keyboard to delete characters. Each selection of the backspace key may sequentially delete a single character included in the text. However, such conventional techniques may result in the deletion of more characters than are included in a portion of the text that is desired to be deleted or replaced. For instance, using such techniques, a user may repeatedly select a backspace key that causes the computing device to sequentially delete characters included in a string of text until a desired portion of the text is deleted (e.g., one or more words, one or more characters included in a word, etc.) However, such sequential deletion may result in the deletion of characters that are not desired to be deleted, such as one or more characters proximal to the characters that are desired to be deleted.

Techniques described herein may improve the ease and accuracy with which a user may enter replacement text using one or more gestures that are performed at or near a presence-sensitive display. According to various techniques of this disclosure, a computing device may output, for display (e.g., at a presence-sensitive display), a graphical user interface (GUI) including a text display region and a graphical keyboard. The computing device may receive an indication of a first gesture detected at a location within the text display region. Based at least in part on the location within the text display region, the computing device may select at least a portion of a character string included in the text display region. As an example, the computing device may receive an indication of a touch gesture detected at a location of the presence-sensitive display associated with a word of text included in the text display region. In response, the computing device may select the word of text included in the text display region.

While the first gesture is detected at the presence-sensitive display, the computing device may receive an indication of at least a portion of a second gesture to select at least one key of the graphical keyboard. In certain examples, such as when the computing device outputs a gesture-based graphical keyboard, the second gesture may include a continuous motion gesture to select a group of keys included in the graphical keyboard. In some examples, the computing device may receive an indication of multiple touch inputs, each of the multiple touch inputs to select an individual key included in the graphical keyboard (e.g., tapping). The computing device may determine a replacement character string based at least in part on at least one character associated with at least one selected key of the graphical keyboard.

The computing device may output, for display (e.g., at the presence-sensitive display), the replacement character string to replace the selected portion of the character string (e.g., a word) included in the text display region. In certain examples, the computing device may output the replacement character string in response to receiving an indication of a termination of the first gesture (i.e., the first gesture to select the character string included in the text display region). In such a way, the computing device may enable a user of the computing device to select a portion of a displayed character string and quickly provide gesture input, such as one or more tap gestures and/or a swipe gesture, to select a replacement character string while the user maintains the gesture input to select the character string to be replaced. As such, techniques described herein may improve the ease with which a user may replace a portion of displayed text by selecting a replacement character string using a graphical keyboard.

Moreover, in certain examples, the computing device may update a text insertion location (e.g., corresponding to a text insertion cursor or carat) in response to outputting the replacement character string. For instance, in response to outputting the replacement character string, the computing device may update a text insertion location to correspond to the end of a group of text. In this way, techniques of this disclosure may enable a user to efficiently replace a portion of displayed text. Moreover, the techniques may enable the user to provide subsequent gesture input to enter text at a previous text insertion location, such as the end of a line of text, without providing gesture input to reposition the text insertion location to the previous location (e.g., the end of the line of text). As such, according to techniques described herein, a computing device may improve the speed with which a user may interact with the computing device to enter text using a graphical keyboard, thereby improving usability of the computing device.

FIG. 1 is a block diagram illustrating an example computing device 2 that, in response to a user input, outputs a replacement character string to replace at least a portion of a displayed character string, in accordance with one or more techniques of this disclosure. In some examples, computing device 2 may be associated with user 12. A user associated with a computing device may interact with the computing device by providing various user inputs into the computing device.

Examples of computing device 2 may include, but are not limited to, portable or mobile devices such as mobile phones (including smart phones), laptop computers, desktop computers, tablet computers, smart television platforms, cameras, personal digital assistants (PDAs), servers, mainframes, one or more processors, etc. As shown in the example of FIG. 1, computing device 2 may be a tablet computer. Computing device 2, in some examples, may include user interface (UI) device 4, UI module 6, gesture module 8, and character replacement module 10. Other examples of computing device 2 that implement techniques of this disclosure may include additional components not shown in FIG. 1.

Computing device 2 may include UI device 4. In some examples, UI device 4 may be configured to receive tactile, audio, or visual input. UI device 4, as shown in FIG. 1, may include a touch-sensitive and/or presence-sensitive display or any other type of device for receiving input. UI device 4 may output content such as graphical user interface (GUI) 14 for display. In the example of FIG. 1, UI device 4 may be a presence-sensitive display that may display a graphical user interface and receive input from user 12 using capacitive, inductive, and/or optical detection at or near the presence-sensitive display.

As shown in FIG. 1, computing device 2 may include UI module 6. UI module 6 may perform one or more functions to receive input, such as user input, and send such input to other components associated with computing device 2, such as gesture module 8 and/or character replacement module 10. For example, UI module 6 may determine a gesture performed by user 12 at UI device 4. UI module 6 may also receive data from components associated with computing device 2, such as gesture module 8 and/or character replacement module 10. Using the data, UI module 6 may cause other components associated with computing device 2, such as UI device 4, to provide output based on the data. For instance, UI module 6 may receive data from character replacement module 10 that causes UI device 4 to display information at text display region 16 of GUI 14.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

Computing device 2, in some examples, includes gesture module 8. Gesture module 8 may include functionality to perform a variety of operations on computing device 2, such as functionality to select at least a portion of a character string included in a text display region of GUI 14 in accordance with the techniques described herein. Gesture module 8 may be implemented in various ways. For example, gesture module 8 may be implemented as a downloadable or pre-installed application or "app." In another example, gesture module 8 may be implemented as part of a hardware unit of computing device 2. In another example, gesture module 8 may be implemented as part of an operating system of computing device 2.

Gesture module 8 may receive data from components associated with computing device 2, such as UI module 6. For instance, gesture module 8 may receive gesture data from UI module 6 that causes gesture module 8 to determine text from the gesture data. In some examples, gesture module 8 determines one or more locations of UI device 4 that are touched or otherwise detected in response to a user gesture, based on information received from UI module 6. Gesture module 8 may also send data to components associated with computing device 2, such as UI module 6 and/or character replacement module 10.

Computing device 2, in certain examples, includes character replacement module 10. Character replacement module 10 may include functionality to perform a variety of operations on computing device 2, such as functionality to output a replacement character string to replace a portion of a character string included in text display region 16 of GUI 14 in accordance with the techniques described herein. Character replacement module 10 may be implemented in various ways. For example, character replacement module 10 may be implemented as a downloadable or pre-installed application or "app." In another example, character replacement module 10 may be implemented as part of a hardware unit of computing device 2. In another example, character replacement module 10 may be implemented as part of an operating system of computing device 2.

Character replacement module 10 may receive data from components associated with computing device 2, such as gesture module 8. For instance, character replacement module 10 may receive gesture data from gesture module 8 that causes character replacement module 10 to select at least a portion of a character string included in GUI 14. Character replacement module 10 may also send data to components associated with computing device 2, such as UI module 6 and/or gesture module 8. For instance character replacement module 10 may send text determined from gesture data to UI module 6 that causes UI device 4 to display GUI 14.

As shown in FIG. 1, GUI 14 may be a user interface generated by UI module 6 that allows user 12 to interact with computing device 2. GUI 14 may include graphical content. Graphical content, generally, may include text, images, a group of moving images, etc. As shown in FIG. 1, graphical content may include text display region 16 and graphical keyboard 18. Graphical keyboard 18 may include a plurality of keys, such as "I" key 28 and "S" key 34. In some examples, each of the plurality of keys included in graphical keyboard 18 represents a single character. In other examples, one or more of the plurality of keys included in graphical keyboard 18 represents a group of characters selected based on a plurality of modes. Graphical keyboard 18 may be displayed by UI device 4 as an ordered set of selectable keys. Keys may represent a single character from a character set (e.g., letters of the English alphabet), or may represent combinations of characters. One example of a graphical keyboard may include a traditional "QWERTY" keyboard layout. Other examples may contain characters for different languages, different character sets, or different character layouts. As shown in the example of FIG. 1, graphical keyboard 18 includes a version of the traditional "QWERTY" keyboard layout for the English language providing character keys as well as various keys (e.g., the "?123" key) providing other functionality.

In some examples, text display region 16 may include characters or other graphical content that are included in, for example, a text-message, a document, an e-mail message, a web browser, and the like. For instance, text display region 16 may include characters or other graphical content that are selected by user 12 via gestures performed at UI device 4.

As illustrated in the example of FIG. 1, text display region 16 may include character string 20 including the characters "This is a". A character string may include one or more characters, such as but not limited to, letter characters, number characters, space delimiter characters, and punctuation characters (e.g., period, comma, semicolon, apostrophe, colon, question mark, exclamation point characters, and the like). For example, while the illustrated example of character string 20 includes letter characters and space delimiter characters, in certain examples a character string may include other types of characters, such as numbers, symbols, punctuation characters, etc.

UI module 6 may determine a text insertion location associated with a location of text display region 16. A text insertion location may correspond to a location of text display region 16 that includes selected text (e.g., one or more characters selected using graphical keyboard 18). As an example, gesture module 8 may receive an indication of one or more gesture inputs detected at UI device 4 (e.g., a presence-sensitive display) to select one or more keys of graphical keyboard 18. UI module 6 may determine, for example, a text insertion location as a location of text display region 16 corresponding to an end of a line of text. In some examples, the end of a line of text may refer to a terminal character position following the last visible character before whitespace (e.g., no subsequent visible characters). UI module 6 may display a selected character at the text insertion location. In response to displaying the selected character at the text insertion location, UI module 6 may update the text insertion location to correspond to a different location of text display region 16, such as a location of text display region 16 that follows the newly-displayed character. In such a way, UI module 6 may enable a user to provide gesture input to sequentially select characters of text to compose, for example, an email, text message, or other character-based message and/or document.

In certain examples, UI module 6 may output for display at text display region 16 a visual indication of the text insertion location. For instance, as illustrated in FIG. 1, UI module 6 may output cursor 24 at a location of text display region 16 corresponding to the text insertion location (e.g., the end of character string 20). However, while illustrated in the example of FIG. 1 as a cursor, techniques of this disclosure are not so limited. For example, UI module 6 may output a visual indication of the text insertion location as a carat, a pointer, a highlighted portion of text display region 16, and the like. In general, UI module 6 may output any indication of the text insertion location that enables a user to discern a location of text display region 16 at which newly-selected text will be displayed. In certain examples, UI module 6 may not output an indication of the text insertion location.

Gesture module 8 may receive an indication of an input unit (e.g., a finger, pen, stylus, and the like) detected at a location within text display region 16. For example, as illustrated in FIG. 1, gesture module 8 may receive an indication of first input unit 27 (e.g., a finger of user 12) detected at location 26 of text display region 16. Character replacement module 10 may select, based at least in part on location 26 (e.g., corresponding to a touch gesture detected at location 26), at least a portion of character string 20. For instance, as illustrated, character replacement module 10 may select portion 22 of character string 20 based at least in part on detecting first input unit 27 at location 26 of text display region 16. In certain examples, character replacement module 10 may select portion 22 as a word included in character string 20. For example, character replacement module 10 may determine a location of text display region 16 that displays a word. The word may include, for example, a sequence of characters included in a language model, such as a dictionary, bounded by one or more of a space delimiter character and a punctuation character. For instance, as in the example of FIG. 1, the word may include the characters "it" included in the English language.

Character replacement module 10 may select portion 22 (e.g., the word "it"), based at least in part on a distance between location 26 and a location of text display region 16 that displays portion 22. For instance, as in the example of FIG. 1, character replacement module 10 may determine a distance (e.g., a Euclidian distance) between location 26 and a location of text display region 16 that displays portion 22 (e.g., a centroid of the region of text display region 16 that displays the word "it"). In some examples, character replacement module 10 may compare the determined distance between location 26 and the location of text display region 16 that displays portion 22 to a threshold distance. Character replacement module 10 may determine that the distance between location 26 and the location of text display region 16 that displays portion 22 satisfies the threshold distance, such as when the determined distance is less than (or equal to) the threshold distance. In response to determining that the determined distance satisfies the threshold distance, character replacement module 10 may select portion 22.

In certain examples, character replacement module 10 may determine multiple distances, each of the multiple distances corresponding to a respective difference between location 26 and a respective portion of character string 20. For instance, character replacement module 10 may determine a first distance between location 26 and a location of text display region 16 that displays portion 22 (i.e., the word "it" in this example). In addition, character replacement module 10 may determine a second distance between location 26 and a location of text display region 16 that displays the word "This". Similarly, character replacement module 10 may determine a third distance between location 26 and a location of text display region 16 that displays the word "a". Character replacement module 10 may compare the respective distances, and may select the portion of character string 20 based at least in part on the comparison. For example, character replacement module 10 may select the portion of character string 20 that corresponds to a minimum of the set of determined distances. For instance, such as in the example of FIG. 1, character replacement module 10 may determine that a distance between location 26 and a location of text display region 16 that displays portion 22 is less than each of the distances between location 26 and the locations of text display region 16 that display the word "this" and the word "a", respectively.

Gesture module 8 may receive an indication of at least a portion of a second gesture, detected at a location of UI device 4 that displays graphical keyboard 18, while the first gesture is detected at location 26. That is, gesture module 8 may receive an indication of first input unit 27 detected at a location of text display region 16 (e.g., location 26). While first input unit 27 is detected at the location of text display region 16, gesture module 8 may receive an indication of second input unit 37 (e.g., another finger of user 12) detected at a location of UI device 4 corresponding to a key of graphical keyboard 18.

In some examples, gesture module 8 may receive an indication of second input unit 37 detected at a location of UI device 4 corresponding to a key of graphical keyboard 18 prior to receiving an indication of first input unit 27 detected at a location of text display region 16. In certain examples, gesture module 8 may receive an indication of first input unit 27 detected at a location of text display region 16 prior to receiving an indication of second input unit 37 detected at a location of UI device 4 corresponding to a key of graphical keyboard 18. In such a way, gesture module 8 may receive an indication of a multi-touch gesture, the multi-touch gesture including both a first input unit detected at a location of UI device 4 within text display region 16 and a second input unit detected at a location of UI device 4 corresponding to a region within graphical keyboard 18. In certain examples, gesture module 8 may determine such a multi-touch gesture in response to determining that both the first input unit and second input unit are detected at locations of UI device 4 for a time period that satisfies a threshold, such as a time period that is greater than (or equal to) twenty milliseconds, one hundred milliseconds, two hundred milliseconds, or other threshold amounts of time. In some examples, gesture module 8 may determine that the multi-touch gesture is received regardless of the order in which the first input unit and second input unit are detected at UI device 4. That is, techniques of this disclosure should not be construed as limited to a particular sequence in which a computing device receives an indication of gesture input detected at a location corresponding to text display region 16 and an indication of gesture input detected at a location corresponding to graphical keyboard 18.

As illustrated in FIG. 1, gesture module 8 may receive an indication of at least a portion of gesture 32 while first input unit 27 is detected at location 26. Gesture 32 may include motion from first location 30 of graphical keyboard 18 to second location 36 of graphical keyboard 18. Gesture module 8 may select one or more keys of graphical keyboard 18 based at least in part on the received indication of gesture 32.

For instance, gesture module 8 may select "I" key 28 and "S" key 34 based at least in part on the received indication of gesture 32 from first location 30 to second location 36.

Character replacement module 10 may determine a replacement character string based at least in part on one or more characters associated with the selected keys of graphical keyboard. For instance, as in the example of FIG. 1, character replacement module 10 may determine the replacement character string "is" based at least in part on the character "i" associated with "I" key 28 and the character "s" associated with "S" key 34. In certain examples, as is described in further detail below, character replacement module 10 may determine one or more candidate replacement character strings, and may determine the replacement character string based at least in part on a received indication of gesture input to select one of the one or more candidate replacement character strings.

Character replacement module 10 may output the replacement character string for display within text display region 16 to replace the selected portion of the character string. For instance, in the example of FIG. 1, character replacement module 10 may output the replacement character string "is" for display at text display region 16 to replace portion 22 (i.e., the character string including the characters "it") of character string 20. That is, character replacement module 10 may output the replacement character string "is" for display at a location of text display region 16 that corresponds to a location of text display region 16 that displays portion 22 of character string 20. In addition, character replacement module 10 may cause UI module 6 to cease to output portion 22 for display at text display region 16, such that the replacement character string "is" is output for display at text display region 16 and portion 22 (e.g., the character string "it" in the example of FIG. 1) is no longer output for display at text display region 16.

In some examples, character replacement module 10 may output the replacement character string to replace portion 22 of character string 20 in response to receiving an indication of a termination of the first gesture (e.g., the first touch gesture detected at location 26). The termination of the first gesture may correspond to an indication of non-detection of first input unit 27 at location 26. For instance, when user 12 lifts his or her finger from UI device 4, gesture module 8 may receive an indication that first input unit 27 is no longer detected at location 26 of UI device 4. In response, gesture module 8 may cause character replacement module 10 to output the replacement character string for display at text display region 16. In such a way, techniques described herein may enable a user to efficiently provide gesture input (e.g., a continuous motion gesture, such as a swipe gesture) to select a replacement character string and cause the computing device to output the replacement character string for display at a text display region.

As another example, character replacement module 10 may output the replacement character string to replace portion 22 of character string 20 in response to receiving an indication of a termination of at least the second gesture (e.g., the second gesture to select one or more keys associated with the replacement character string). That is, in certain examples, gesture module 8 may receive an indication of at least a portion of gesture 32 while first input unit 27 is detected at location 26. In some examples, the received indication of at least the portion of gesture 32 while first input unit 27 is detected at location 26 may be considered a triggering event. That is, in certain examples, a triggering event may include a touch down event detected within the text display region followed by a second touch down even detected within the graphical keyboard region before a touch up event for the input device in the text display region is received. In certain examples, a triggering event may include a held double tap gesture. For instance a triggering event including a held double tap gesture may include a first touch down event detected within the text display region followed by a touch up event detected within the text display region followed by a second touch down event detected within the text display region (e.g., a held double tap) followed by a third touch down event detected within the graphical keyboard region. In certain examples, gesture module 8 may determine that a held double tap triggering event is satisfied, such as when the first touch down event, the touch up event, and the second touch down event are each detected within a threshold time duration, such as one half of a second, one second, or other threshold time durations.

In certain examples, character replacement module 10 may initiate a character string replacement mode (e.g., an operational state) in response to receiving the triggering event. In some examples, while character replacement module 10 operates within an instance of the character string replacement mode, character string replacement module 10 may determine a replacement character string to replace a selected portion of displayed text rather than determining text to be inserted at a previous text insertion location (e.g., at an end of a line of text). In certain examples, character replacement module 10 may exit the character string replacement mode in response to receiving an indication of a termination of the gesture detected at text display region 16 (e.g., location 26). In some examples, while character replacement module 10 does not operate in the character string replacement mode, UI module 6 may output subsequently selected text at a cursor location, such as at a terminal location of text included in text display region 16.

Subsequent to receiving the indication of the portion of gesture 32, and prior to receiving an indication of a termination of gesture 32 (e.g., an indication of non-detection of second input unit 37 at UI device 4), gesture module 8 may receive an indication of non-detection of first input unit 27 at UI device 4. In such an example, character replacement module 10 may determine a replacement character string based at least in part on the received indication of gesture 32, and may output the replacement character string for display at text display region 16 responsive to receiving an indication of a termination of gesture 32. In this way, computing device 2 may enable a user to initiate a selection of a replacement character string by providing a multi-touch gesture input including at least simultaneous touch input at a location of text display region 16 and touch input at a location of UI device 4 associated with graphical keyboard 18. Moreover, by outputting the replacement character string in response to receiving an indication of a termination of gesture 32 (e.g., a gesture to select one or more keys of graphical keyboard 18), computing device 2 may enable a user to provide gesture input to select the replacement character string without maintaining the gesture input to select the portion of the character string to be replaced (e.g., without maintaining the touch gesture input at location 26 of UI device 4).

Similarly, techniques of this disclosure may enable a user to provide multi-touch gesture input to initiate selection of a replacement character string and thereafter provide multiple touch gestures to select the replacement character string without maintaining the gesture input to select the portion of the character string to be replaced. That is, while the example of FIG. 1 is illustrated with respect to gesture 32 including a continuous motion gesture (e.g., a swipe gesture) to select one or more keys of graphical keyboard 18, techniques of this disclosure are not so limited. For instance, in certain examples, gesture module 8 may receive an indication of at least a touch gesture detected at a location of UI device 4 associated with a key of graphical keyboard 18 while first input unit 27 is detected at location 26 to initiate selection of a replacement character string. Thereafter, gesture module 8 may receive multiple touch inputs detected at locations of graphical keyboard 18, each of the multiple touch inputs to select a key of graphical keyboard 18. In such an example, character replacement module 10 may determine the replacement character string based at least in part on characters associated with the selected keys of graphical keyboard 18. Character replacement module 10 may output the replacement character string for display at text display region 16 in response to receiving an indication of a gesture detected at a location of UI device 4 associated with a selectable element of GUI 14, such as a key of graphical keyboard 18, a candidate replacement character string, or other selectable element of GUI 14.

As an example, gesture module 8 may receive an indication of a gesture detected at location 26 of text display region 16 (e.g., using first input unit 27). While first input unit 27 is detected at location 26, gesture module 8 may receive an indication of a second gesture (e.g., a tap gesture) detected at first location 30 of graphical keyboard 18 to select "I" key 28. Thereafter, gesture module 8 may receive an indication of a third gesture (e.g., a tap gesture) detected at second location 36 to select "S" key 34. In certain examples, gesture module 8 may receive the indication of the third gesture (e.g., to select "S" key 34) after receiving an indication of a termination of the first gesture detected at location 26 to select portion 22 of character string 20. Character replacement module 10 may determine the replacement character string based at least in part on the received indications of the second and third gestures to select "I" key 28 and "S" key 34, respectively. In such examples, character replacement module 10 may output the replacement character string for display at text display region 16 in response to receiving an indication of a termination of a gesture detected at a location of UI device 4 associated with a key of graphical keyboard 18 (e.g., an enter key, a space key, etc.). For instance, character replacement module 10 may output the replacement character string in response to receiving an indication of a gesture detected at a location of UI device 4 associated with a space key of graphical keyboard 18 (i.e., a key of graphical keyboard 18 associated with a space delimiter character).

In certain examples, character replacement module 10 may output the replacement character string in response to receiving an indication of a gesture detected at a location of UI device 4 associated with a punctuation key of graphical keyboard 18 (e.g., a period key, a comma key, a colon key, and the like). In some examples, as is described in further detail below, character replacement module 10 may output, for display at GUI 14, one or more candidate replacement character strings. In such examples, character replacement module 10 may output the replacement character string in response to receiving an indication of a gesture detected at a location of UI device 4 associated with one of the one or more candidate replacement character strings.

In this way, computing device 2 may enable a user to initiate selection of a replacement character string by providing multi-touch input including at least a touch gesture at a location of UI device 4 within text display region 16 and a touch gesture at a location of UI device 4 associated with graphical keyboard 18. By outputting the replacement character string in response to receiving an indication of gesture input detected at a location of UI device 4 associated with a selectable element of GUI 14 (e.g., a space key of graphical keyboard 18), computing device 2 may enable a user to provide gesture input to select the replacement character string without maintaining the gesture input to select the portion of the character string to be replaced (e.g., portion 22). As such, according to techniques described herein, computing device 2 may enable a user to initiate selection of a replacement character string using two input devices (e.g., two fingers), and thereafter provide multiple touch inputs to select keys of graphical keyboard 18 using both input devices (e.g., both fingers).

In certain examples, character replacement module 10 may cause UI module 6 to update a text insertion location responsive to outputting the replacement character string for display within text display region 16. For example, gesture module 8 may determine a text insertion location of text display region 16 as a first text insertion location of text display region 16. As illustrated in FIG. 1, gesture module 8 may determine the first text insertion location as a location of text display region 16 associated with an end of a line of text, such as the end of character string 20. In certain examples, UI module 6 may output a graphical indicator, such as cursor 24, to visually indicate the first text insertion location.

Gesture module 8 may receive an indication of a gesture detected at location 26 of text display region 16. As illustrated, location 26 may be a different location of text display region 16 than the first text insertion location. In response to receiving the indication of the gesture detected at location 26, gesture module 8 may update the text insertion location to correspond to location 26 (e.g., a second text insertion location). For example, character replacement module 10 may select portion 22 of character string 20 based at least in part on the received indication of the gesture detected at location 26. In response, gesture module 8 may update the text insertion location to correspond to a location of text display region associated with portion 22, such as a location corresponding to the first character of portion 22 (i.e., the character "i" included in the character string "it" of portion 22). In certain examples, gesture module 8 may cause UI module 6 to display cursor 24 at a location of text display region 16 corresponding to the updated text insertion location (e.g., the second text insertion location). In other examples, gesture module 8 may not cause UI module 6 to display cursor 24 at the location corresponding to the updated text insertion location. In yet other examples, UI module 6 may not display cursor 24. In such examples, gesture module 8 may determine the text insertion location, but may not cause UI module 6 to output a visual indication (e.g., cursor 24) of the text insertion location.

In some examples, in response to outputting the replacement character string for display at text display region 16, character replacement module 10 may cause gesture module 8 to update the text insertion location to correspond to a different text insertion location. For instance, in the example of FIG. 1, character replacement module 10 may cause gesture module 8 to update the text insertion location to correspond to the end of character string 20. In some examples, gesture module 8 may cause UI module 6 to display a visual indication of the updated text insertion location, such as by causing UI module 6 to display cursor 24 at the end of character string 20. As such, computing device 2 may enable a user (e.g., user 12) to efficiently replace a portion of a displayed character string and continue to provide gesture input to enter text at the end of the character string without requiring the user to provide subsequent gesture input to reposition the text insertion location to the end of the character string.

Techniques of this disclosure may increase the ease and efficiency with which a user may interact with a computing device to select text using a graphical keyboard. Accordingly, techniques described herein may enhance the user experience to enter text using a graphical keyboard of the computing device, such as to compose an email, text message, or other character-based message and/or document.

Figure 2:
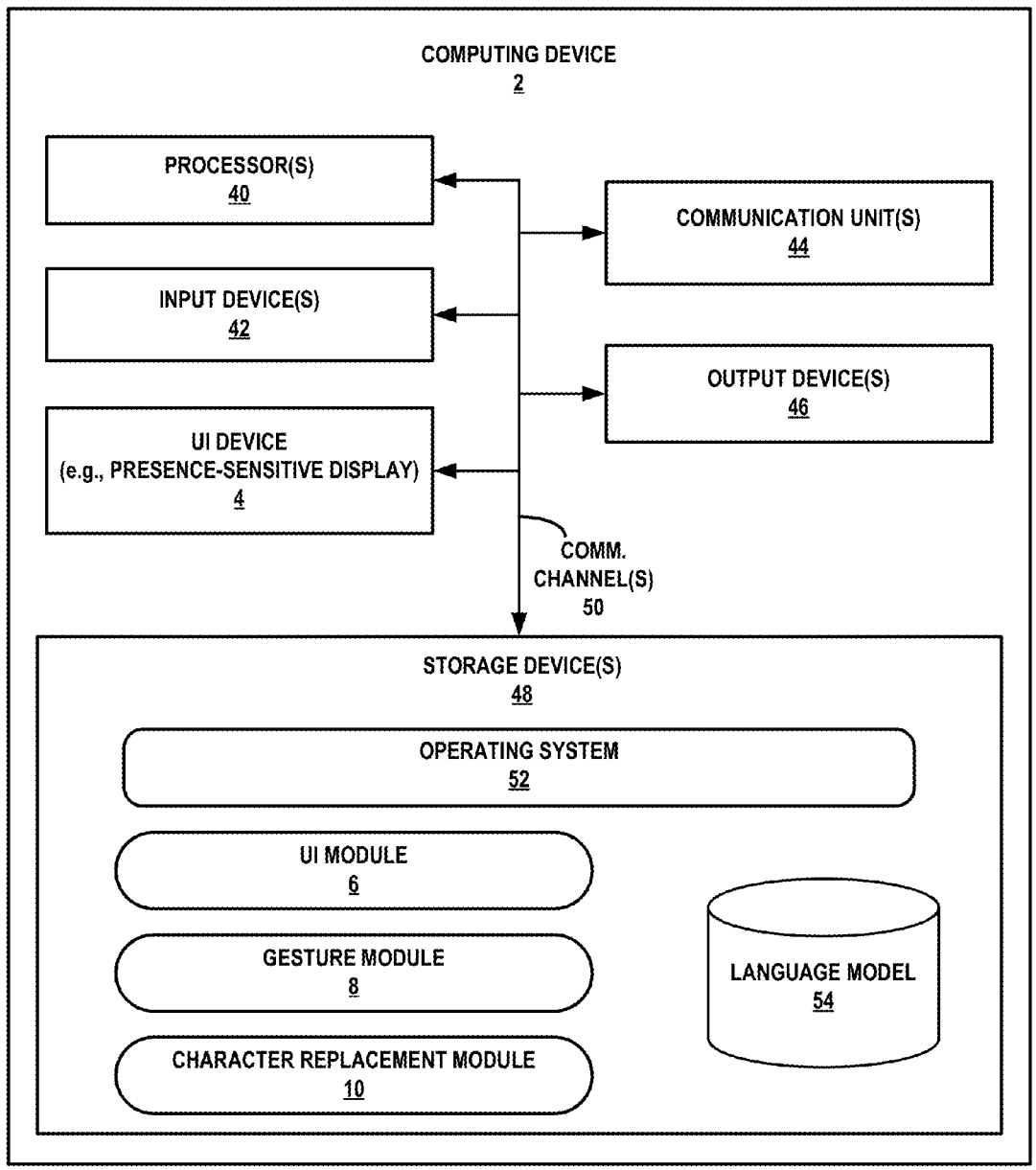
FIG. 2 is a block diagram illustrating further details of one example of a computing device as shown in FIG. 1, in accordance with one or more techniques of this disclosure.

FIG. 2 is a block diagram illustrating further details of one example of computing device 2 as shown in FIG. 1, in accordance with one or more techniques of this disclosure. FIG. 2 illustrates only one particular example of computing device 2, and many other examples of computing device 2 may be used in other instances.

As shown in the specific example of FIG. 2, computing device 2 includes UI device 4, one or more processors 40, one or more input devices 42, one or more communication units 44, one or more output devices 46, and one or more storage devices 48. As illustrated, computing device 2 further includes UI module 6, gesture module 8, character replacement module 10, and operating system 52 that are executable by computing device 2. Each of components 4, 40, 42, 44, 46, and 48 may be interconnected (physically, communicatively, and/or operatively) for inter-component communications. In some examples, communication channels 50 may include a system bus, network connection, inter-process communication data structure, or any other channel for communicating data. As one example in FIG. 2, components 4, 40, 42, 44, 46, and 48 may be coupled by one or more communication channels 50. Gesture module 8, UI module 6, character replacement module 10, and operating system 52 may also communicate information with one another as well as with other components of computing device 2.

One or more processors 40, in one example, are configured to implement functionality and/or process instructions for execution within computing device 2. For example, one or more processors 40 may be capable of processing instructions stored at one or more storage devices 48. Examples of one or more processors 40 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. One or more storage devices 48, in some examples, may be described as a computer-readable storage medium. In some examples, one or more storage devices 48 may be a temporary memory, meaning that a primary purpose of one or more storage devices 48 is not long-term storage. One or more storage devices 48, in some examples, may be described as a volatile memory, meaning that one or more storage devices 48 do not maintain stored contents when the computer is turned off. Examples of volatile memories include random access memories (RAM), dynamic random access memories (DRAM), static random access memories (SRAM), and other forms of volatile memories known in the art. In some examples, one or more storage devices 48 may be used to store program instructions for execution by one or more processors 40. One or more storage devices 48, for example, may be used by software or applications running on computing device 2 (e.g., UI module 6, gesture module 8, and character replacement module 10) to temporarily store information during program execution.

One or more storage devices 48, in some examples, also include one or more computer-readable storage media. One or more storage devices 48 may be configured to store larger amounts of information than volatile memory. One or more storage devices 48 may further be configured for long-term storage of information. In some examples, one or more storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In some examples, one or more storage devices 48 may store one or more instructions that cause one or more processors 40, UI module 6, gesture module 8, and character replacement module 10 to perform various functions ascribed to one or more processors 40, UI module 6, gesture module 8, and character replacement module 10. Although shown as separate components in FIG. 2, in some examples, one or more of UI module 6, gesture module 8, and character replacement module 10 may be part of the same module. In some examples, one or more of UI module 6, gesture module 8, character replacement module 10, and one or more processors 40 may be formed in a common hardware unit. In some instances, one or more of UI module 6, gesture module 8, and character replacement module 10 may be software and/or firmware units that are executed on one or more processors 40. In general, UI module 6, gesture module 8, and character replacement module 10 are presented separately for ease of description and illustration. However, such illustration and description should not be construed to imply that UI module 6, gesture module 8, and character replacement module 10 are necessarily separately implemented, but can be in some examples. Also, in certain examples, one or more processors 40 may include one or more of UI module 6, gesture module 8, and character replacement module 10.

Computing device 2, in some examples, also includes one or more communication units 44. Computing device 2, in one example, utilizes one or more communication units 44 to communicate with external devices via one or more networks, such as one or more wireless networks. One or more communication units 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes one or more communication units 44 to wirelessly communicate with an external device such as another computing device.

Computing device 2, in one example, also includes one or more input devices 42. One or more input devices 42, in some examples, may be configured to receive input from a user through tactile, audio, or video feedback. Examples of one or more input devices 42 include a presence-sensitive display, a mouse, a keyboard, a voice responsive system, video camera, microphone or any other type of device for detecting input from a user. In some examples, a presence-sensitive display includes a touch-sensitive screen.

One or more output devices 46 may be configured to provide output to a user using tactile, audio, or video stimuli. One or more output devices 46, for example, may include a presence-sensitive display, a touch-sensitive screen, a sound card, a video graphics adapter card, or any other type of device for converting a signal into an appropriate form understandable to humans or machines. Additional examples of one or more output devices 46 include a speaker, a cathode ray tube (CRT) monitor, a liquid crystal display (LCD), or any other type of device that can generate intelligible output to a user. In some examples, UI device 4 may include functionality of one or more input devices 42 and/or one or more output devices 46.

In some examples, UID 4 of computing device 2 may include functionality of input devices 42 and/or output devices 46. In the example of FIG. 2, UID 4 may be or may include a presence-sensitive screen. In some examples, a presence-sensitive screen may detect an object at and/or near the presence-sensitive screen. As one example range, a presence-sensitive screen may detect an object, such as a finger or stylus that is within two inches or less of the presence-sensitive screen. The presence-sensitive screen may determine a location (e.g., an (x,y) coordinate) of the presence-sensitive screen at which the object was detected. In another example range, a presence-sensitive screen may detect an object six inches or less from the presence-sensitive screen and other exemplary ranges are also possible. The presence-sensitive screen may determine the location of the screen selected by a user's finger using capacitive, inductive, and/or optical recognition techniques. In some examples, presence-sensitive screen provides output to a user using tactile, audio, or video stimuli as described with respect to output device 46. In the example of FIG. 2, UID 4 presents a user interface (such as user interface 14 of FIG. 1), and other various functions and applications executing on computing device 2 at the presence-sensitive screen of UID 4.

Computing device 2 may include operating system 52. Operating system 52, in some examples, controls the operation of components of computing device 2. For example, operating system 52, in one example, facilitates the communication of UI module 6, gesture module 8, and character replacement module 10 with one or more processors 40, UI device 4, one or more storage devices 48, one or more input devices 42, one or more output devices 46, and one or more communication units 44.

UI module 6, gesture module 8, and character replacement module 10 may, in certain examples, include program instructions and/or data that are executable by computing device 2. As one example, UI module 6, gesture module 8, and character replacement module 10 may include instructions that cause computing device 2 to perform one or more of the operations and actions described in the present disclosure.

Techniques of the disclosure are now further described with respect to FIG. 2. In one example, UI module 6 may output, for display at UI device 4 (e.g., a presence-sensitive display), a graphical user interface including a text display region and a graphical keyboard. For instance, UI module 6 may output GUI 14 for display at UI device 4. GUI 14 may include text display region 16 and graphical keyboard 18. Gesture module 8 may receive an indication of a first gesture detected at the presence-sensitive display at a location within the text display region. For example, gesture module 8 may receive an indication of a first gesture detected at UI device 4 at location 26 within text display region 16. Character replacement module 10 may select, based at least in part on the location within the text display region, at least a portion of a character string included in the text display region. As an example, UI module 6 may output character string 20 (e.g., the character string "This is a") for display at text display region 16. Character replacement module 10 may select portion 22 (e.g., the portion of character string 20 including the character string "it"). Character replacement module 10 may select portion 22 based at least in part on the received indication of the first gesture at location 26. For instance, character replacement module 10 may select portion 22 based at least in part on a determined distance between location 26 and a location of text display region 16 that displays portion 22.

Gesture module 8 may receive, while the first gesture is detected at the presence-sensitive display, an indication of at least a portion of a second gesture to select at least one key of the graphical keyboard. For example, gesture module 8 may receive, while first input unit 27 is detected at location 26 of UI device 4, an indication of at least a portion of gesture 32 to select "I" key 28 and "S" key 34 of graphical keyboard 18. Character replacement module 10 may output, responsive to receiving an indication of a termination of at least the second gesture, a replacement character string for display within the text display region to replace the portion of the character string. The replacement character string may be based at least in part on the at least one key. As an example, character replacement module 10 may determine the replacement character string "is" based at least in part on "I" key 28 and "S" key 34. Character replacement module 10 may output the replacement character string "is" for display at text display region 16. In certain examples, character replacement module 10 may output the replacement character string responsive to receiving an indication of a termination of the second gesture (i.e., the second gesture to select the at least one key of graphical keyboard 18). In some examples, character replacement module 10 may output the replacement character string responsive to receiving an indication of a termination of the first gesture (i.e., the first gesture to select the portion of the character string). In certain examples, character replacement module 10 may output the replacement character string responsive to receiving an indication of a termination of the first gesture and an indication of a termination of the second gesture.

As illustrated in FIG. 2, computing device 2, in some examples, includes language model 54. Language model 54 may include a lexicon. In some examples, a lexicon may include a listing of words and may include additional information about the listed words. A lexicon may be represented by one or more data structures, such as by one or more of an array, a list, a tree, or other data structures. For example, language model 54 may include a lexicon stored in a tie data structure. In certain examples, language model 54 may include a group of predefined phrases installed on computing device 2. In other examples, language model 54 may include multiple sources of lexicons, which may be stored at computing device 2 or stored at one or more remote computing devices that are accessible to computing device 2 via one or more communication units 44.

In some examples, language model 54 may be implemented in the firmware of computing device 2. Language model 54 may include language model frequency information such as n-gram language models. An n-gram language model may provide a probability distribution for an item $x_i$ (letter, word, punctuation character or other delimiter) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "s" follows the letter "i". As another example, a bigram language model may provide a probability that the word "is" follows the word "this". As yet another example, a trigram language model (an n-gram model where n=3) may provide a probability that the word "a" follows the sequence of words "this is". In some examples, language model 54 includes a lexicon trie with integrated language model frequency information. For instance, each node of the lexicon trie may include a representation of a letter and a probability value.

In certain examples, character replacement module 10 may determine the replacement character string based at least in part on language model 54. For example, character replacement module 10 may determine a candidate replacement character string based on characters associated with selected keys of graphical keyboard 18 and language information included in language model 54. For instance, character replacement module 10 may determine a replacement character string based on a determination that the replacement character string is included in a lexicon, such as the English language. In some examples, character replacement module 10 may determine one or more candidate replacement character strings based at least in part on the selected keys of graphical keyboard 18 and language model 54. For example, in response to receiving an indication of gesture input to select "I" key 28, character replacement module 10 may determine one or more candidate replacement character strings, including character strings beginning with the letter "I" that form words included in a lexicon of language model 54. Similarly, in response to receiving an indication of gesture input to select "S" key 34, character replacement module 10 may determine one or more candidate replacement character strings, including character strings that begin with the letters "is" that form words included in a lexicon of language model 54. For instance, character replacement module 10 may determine one or more such candidate replacement character strings including the character string "is" (e.g., the word "is" included in the English language), the character string "isn't", the character string "island", or other candidate replacement character strings.

In some examples, as is described in further detail below, character replacement module 10 may cause UI module 6 to output one or more of the candidate replacement character strings for display at GUI 14. In certain examples, character replacement module 10 may determine the one or more candidate replacement character strings for display at GUI 14 based at least in part on word-frequency information included in language model 54. For instance, character replacement module 10 may determine, based on word-frequency information included in language model 54, that the word "isn't" is a more frequently used word in a lexicon (e.g., the English language) than the word "island". In such an example, character replacement module 10 may cause UI module 6 to output the word "isn't" for display at GUI 14 rather than the word "island" based on the determination that the word "isn't" is a more frequently used word in the lexicon. In certain examples, character replacement module 10 may cause UI module 6 to output multiple candidate replacement character strings, such as two candidate replacement character strings, three candidate replacement character strings, five candidate replacement character strings, or other numbers of candidate replacement character strings. In some examples, character replacement module 10 may cause UI module 6 to output the "n" most frequently used candidate replacement character strings, where "n" represents a predefined number of candidate replacement character strings (e.g., three candidate replacement character strings).

Figure 3:
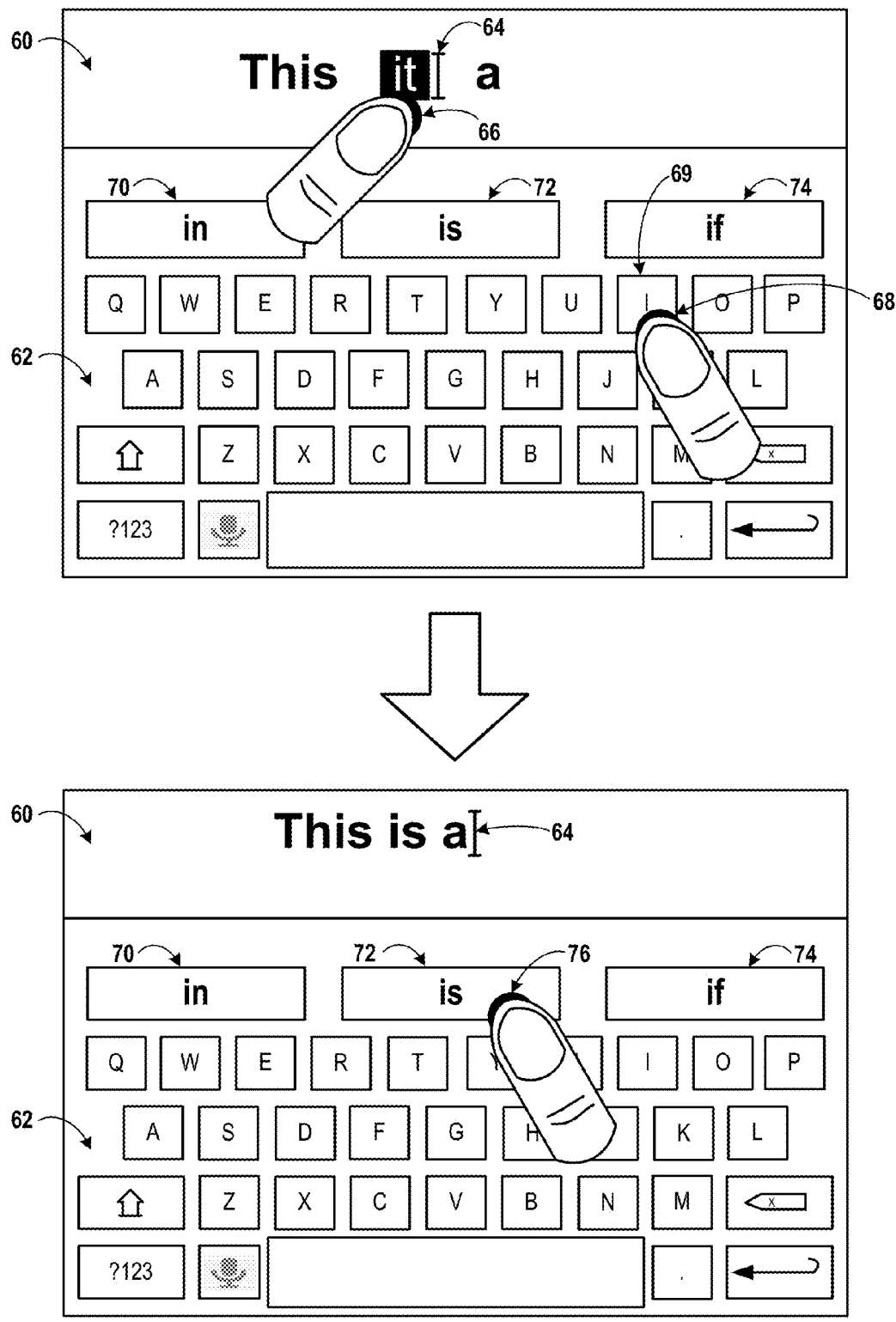
FIG. 3 is a block diagram illustrating further details of one example of a computing device as shown in FIG. 1, in accordance with one or more techniques of this disclosure.

FIG. 3 is a block diagram illustrating further details of one example of computing device 2 as shown in FIG. 1, in accordance with one or more techniques of this disclosure. As illustrated in FIG. 3, UI module 6 may output a GUI, for display (e.g., a UI device 4), including text display region 60 and graphical keyboard 62. Gesture module 8 may receive an indication of a first gesture detected at first location 66 of text display region 60. Character replacement module 10 may select, based at least in part on first location 66, at least a portion of a character string included in text display region 60. For instance, as in the example of FIG. 3, character replacement module 10 may select a portion of the displayed character string, the portion including the characters "it". In some examples, as illustrated in FIG. 3, character replacement module 10 may cause UI module 6 to output a visual indication of the selected portion of the character string, such as a visual highlighting, underlining, bolding, color change, etc. of the selected portion of the character string. As further illustrated in FIG. 3, in response to receiving the indication of the first gesture detected at location 66, gesture module 8 may update a text insertion location to correspond to location 66. For instance, gesture module 8 may update a text insertion location to correspond to a location of text display region 60 that displays the selected portion of the character string. Gesture module 8 may cause UI module 6 to output cursor 64 at the location of text display region 60 that corresponds to the text insertion location.

Gesture module 8 may receive, while the first gesture is detected at location 66 of UI device 4, an indication of at least a portion of a second gesture to select at least one key of graphical keyboard 62. For example, gesture module 8 may receive an indication of a touch gesture detected at location 68 to select "I" key 69 of graphical keyboard 62. Character replacement module 10 may determine one or more candidate character replacement strings based at least in part on the selected "I" key 69. For example, character replacement module 10 may determine one or more candidate replacement character strings including character strings that begin with the letter "I" that form a word included in a lexicon of language model 54. In certain examples, character replacement module 10 may cause UI module 6 to output one or more of the candidate replacement character strings for display at the GUI. For instance, as illustrated, character replacement module 10 may determine candidate replacement character strings, including the character strings "in", "is", and "if".

Character replacement module 10 may cause UI module 6 to output one or more of the candidate replacement character strings for display at the GUI, such as at text suggestion regions 70, 72, and 74. In certain examples, and in response to receiving the indication of the gesture input to initiate selection of the replacement character string, character replacement module 10 may cause UI module 6 to increase the area of the region of UI device 4 that is used to display text suggestion regions 70-74. For instance, in response to receiving gesture input to initiate selection of the replacement character string, character replacement module 6 may cause UI module 6 to output text suggestion regions 70-74 at a region of UI device 4 that displays text display region 60 during instances of operation where replacement character string selection is not initiated. In certain examples, in addition to outputting candidate replacement character strings for display at text suggestion regions 70-74, character replacement module 10 may cause UI module 6 to output words included in the character string that precede and/or follow the selection portion of the character string.

Gesture module 8 may receive an indication of a gesture input to select one of the one or more candidate replacement character strings. As illustrated in FIG. 3, gesture module 8 may receive an indication of a touch gesture detected at location 76 of UI device 4, location 76 corresponding to text suggestion region 72. In such an example, character replacement module 10 may select the candidate character string associated with the selected text suggestion region. In response, character replacement module 10 may cause UI module 6 to output the selected replacement character string for display at text display region 60. In addition, as illustrated in FIG. 3, gesture module 8 may update the text insertion location to correspond to the location at the end of the character string.

Figure 4:
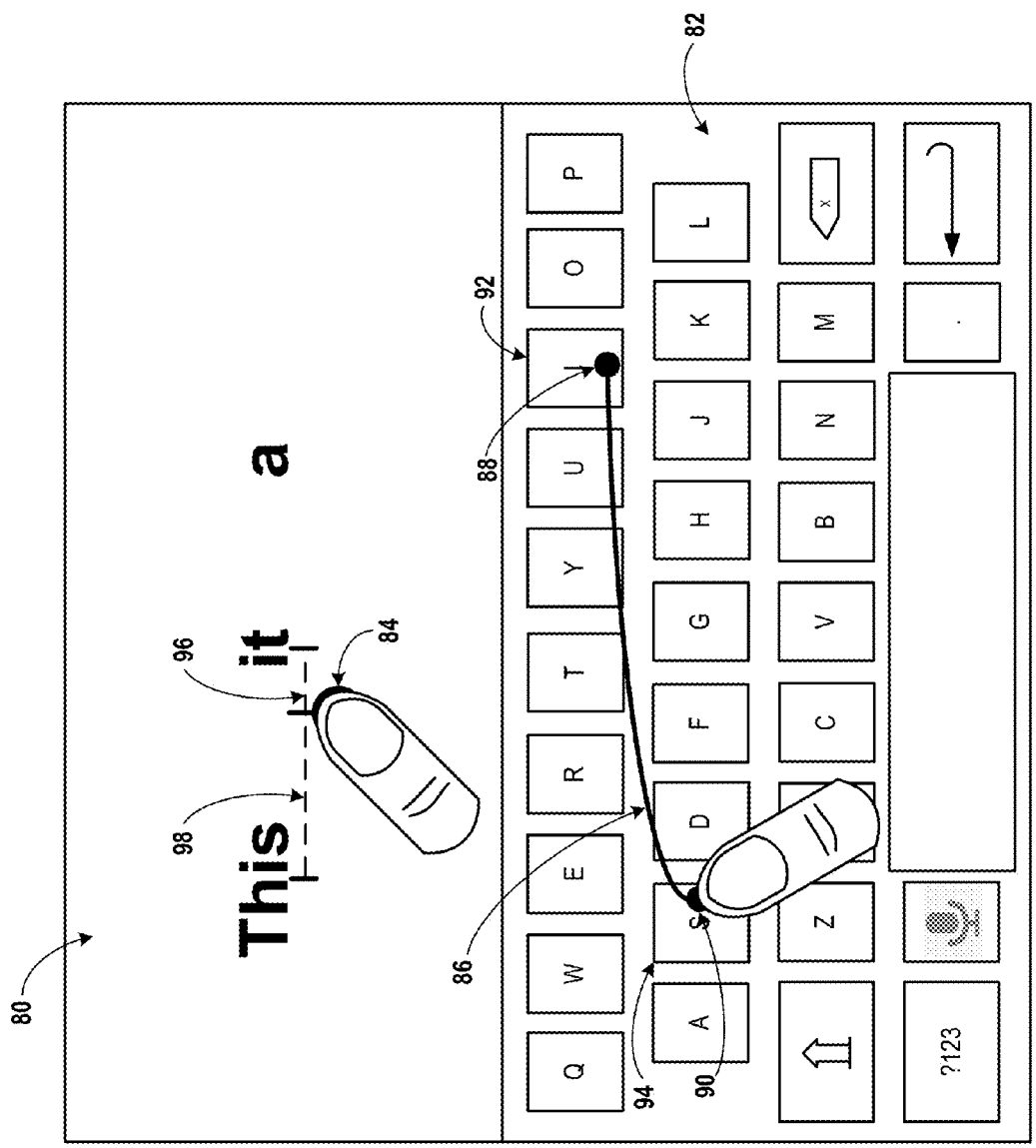
FIG. 4 is a block diagram illustrating further details of one example of a computing device as shown in FIG. 1, in accordance with one or more techniques of this disclosure.

FIG. 4 is a block diagram illustrating further details of one example of computing device 2 as shown in FIG. 1, in accordance with one or more techniques of this disclosure. As illustrated in FIG. 4, UI module 6 may output, for display (e.g., at UI device 4), a GUI including text display region 80 and graphical keyboard 82. UI module 6 may output a character string for display at text display region 80, such as the illustrated character string "This it a". Gesture module 8 may receive an indication of a first gesture detected at a location of UI device 4 within text display region 80, such as at location 84. Character replacement module 10 may select, based at least in part on location 84, at least a portion of the character string.

In some examples, character replacement module 10 may select the portion of the character string based at least in part on a determined distance between location 84 and one or more portions of the character string. For instance, character replacement module 10 may determine first distance 96 between location 84 and a location of UI device 4 associated with the word "it" included in the character string (e.g., a centroid of the region of text display region 80 that displays the word "it"). Similarly, character replacement module 10 may determine second distance 98 between location 84 and a location of UI device 4 associated with the word "this" included in the character string. In some examples, character replacement module 10 may select the portion of the character string based at least in part on a comparison of first distance 96 and second distance 98. For example, character replacement module 10 may determine that first distance 96 is less than second distance 98. In response, character replacement module 10 may select the portion "it" of the displayed character string.

In some examples, character replacement module 10 may select the portion of the character string based at least in part on received gesture input to select one or more keys of graphical keyboard 82. As illustrated in FIG. 4, gesture module 8 may receive, while the first gesture is detected at location 84 of text display region 80, an indication of at least a portion of gesture 86 to select at least one key of graphical keyboard 82. Gesture 86 may include motion of an input unit (e.g., a finger, pen, stylus, etc.) from first location 88 to select "I" key 92 to second location 90 to select "S" key 94. Character replacement module 10 may select the portion of the character string based at least in part on the received indication of gesture 86.

As one example, character replacement module 10 may determine a number of keys of graphical keyboard 82 that are selected after receiving gesture input to initiate selection of a replacement character string. Character replacement module 10 may compare the number of keys that are selected to a number of characters included in a portion (e.g., a word) of the character string, and may select the portion of the character string based at least in part on the comparison. For instance, gesture module 8 may select, based at least in part on the received indication of gesture 86, two keys of graphical keyboard 82 (i.e., "I" key 92 and "S" key 94). Character replacement module 10 may compare the number of characters included in a portion of the character string, such as the portion of the character string including the word "this" (i.e., four characters) to the number of selected keys (i.e., two in this example). Similarly, character replacement module 10 may compare the number of characters included in the portion of the character string including the word "it" (i.e., two characters) to the number of selected keys (i.e., two). Character replacement module 10 may determine that the number of selected keys more closely matches the number of characters in the word "it" than the number of characters in the word "this". In response, character replacement module 10 may select the portion of the character string including the word "it" for replacement.

In some examples, character replacement module 10 may select the portion of the character string based at least in part on a comparison of one or more characters associated with selected keys of graphical keyboard 82 to one or more characters included in the portion of the character string. For instance, character replacement module 10 may select the portion of displayed character string including the word "it" based on a determination that the word "it" begins with the letter "i" and that "I" key 92 was the first key selected based on gesture 86.

In certain examples, character replacement module 10 may select a portion of the character string based on a combination of: a distance between location 84 and the portion of the character string; a comparison of the number of keys of graphical keyboard 82 that are selected to a number of characters included in the portion of the character string; and a comparison of one or more characters associated with selected keys of graphical keyboard 82 to one or more characters included in the portion of the character string. For example, character replacement module 10 may determine a score for each of two or more portions of the character string based on the determination of the combination of distance, number of characters, and similarity of characters. In certain examples, character replacement module 10 may select the portion of the character string based on the comparison of the scores, such as by selecting the portion of the character string corresponding to the highest score (e.g., in examples where a high score corresponds to an increased correlation to the portion of the character string). In certain examples, such as when a low score corresponds to an increased correlation to the portion of the character string, character replacement module 10 may select the portion of the character string corresponding to the lowest score.

In such a way, aspects of this disclosure may enable a computing device to improve the accuracy with which the computing device selects a portion of a character string. As such, the techniques described herein may improve the ease with which a user may interact with the computing device to select a portion of a displayed character string and provide gesture input to select a replacement character string to replace the selected portion.

Figure 5:
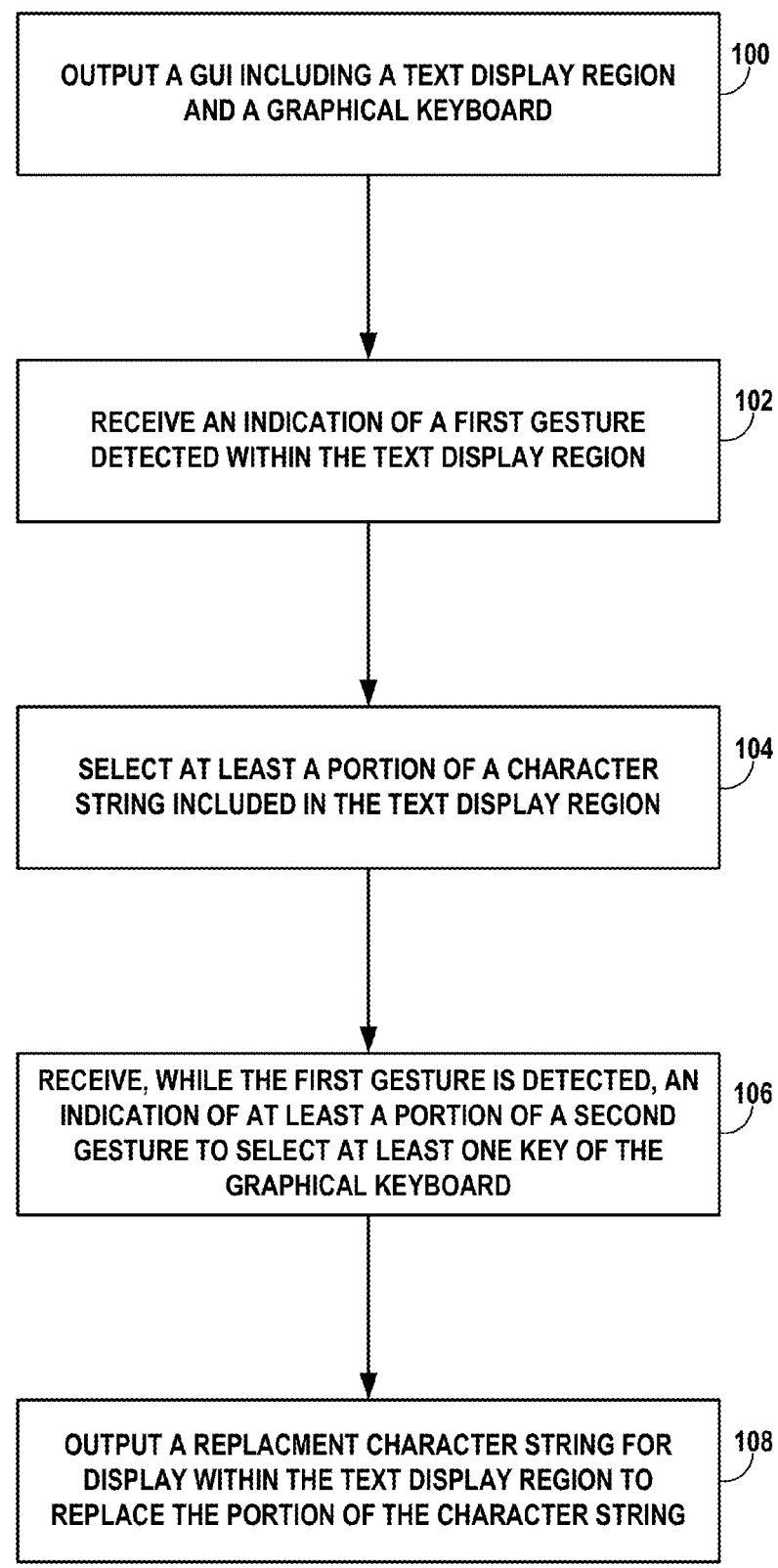
FIG. 5 is a flow diagram illustrating example operations of a computing device to output a replacement character string to replace at least a portion of a displayed character string, in accordance with one or more techniques of this disclosure.

FIG. 5 is a flow diagram illustrating example operations of a computing device to output a replacement character string to replace at least a portion of a displayed character string, in accordance with one or more techniques of this disclosure. For purposes of illustration only, the example operations are described below within the context of computing device 2, as shown in FIGS. 1 and 2.

Computing device 2 may output, for display at a presence-sensitive display, a graphical user interface including a text display region and a graphical keyboard (100). For example, UI module 6, executing on one or more processors 40, may output, for display at UI device 4 (e.g., a presence-sensitive display), GUI 14 including text display region 16 and graphical keyboard 18. As one example, UI module 6 may output, for display at text display region 16, character string 22 including the string of characters "This it a". Computing device 2 may receive an indication of a first gesture detected at the presence-sensitive display at a location within the text display region (102). For example, gesture module 8 may receive an indication of a first gesture detected at location 26 of text display region 16.

Computing device 2 may select, based at least in part on the location within the text display region, at least a portion of a character string included in the text display region (104). For instance, character replacement module 10 may select portion 22 of character string 20, portion 22 including the characters "it". Computing device 2 may receive, while the first gesture is detected at the presence-sensitive display, an indication of at least a portion of a second gesture to select at least one key of the graphical keyboard (106). For example, gesture module 8 may receive an indication of at least a portion of gesture 32 including motion from first location 30 to select "I" key 28 to second location 36 to select "S" key 34.

Computing device 2 may output, responsive to receiving an indication of a termination of at least the second gesture, a replacement character string for display within the text display region to replace the portion of the character string (108). The replacement character string may be based at least in part on the at least one key. As an example, computing device 2 may determine the replacement character string including the characters "is" based at least in part on the received indication of gesture 32 to select "I" key 28 and "S" key 34. Character replacement module 10 may cause UI module 6 to output, responsive to receiving an indication of a termination of at least the second gesture, the replacement character string "is" for display at text display region 16.

In one example, a first location within the text display region comprises a text insertion location, receiving the indication of the first gesture detected at the presence-sensitive display at the location within the text display region comprises receiving the indication of the first gesture detected at the presence-sensitive display at a second location within the text display region, the second location is different than the first location, and the operations further include updating, by computing device 2 and responsive to receiving the indication of the first gesture detected at the presence-sensitive display at the second location within the text display region, the text insertion location to correspond to the second location, and updating, by computing device 2 and responsive to outputting the replacement character string for display within the text display region, the text insertion location to the first location. In one example, the first location corresponds to a location at the end of the character string.

In one example, updating the text insertion location to the first location is further responsive to receiving, by computing device 2, an indication of a termination of the first gesture. In one example, outputting the replacement character string for display within the text display region is further responsive to receiving, by computing device 2, an indication of a termination of the first gesture. In one example, the portion of the character string comprises one or more characters bounded by one or more of a space delimiter character and a punctuation character.

In one example, receiving the indication of at least the portion of the second gesture to select the at least one key of the graphical keyboard comprises receiving the indication of at least the portion of the second gesture to select a first key of the graphical keyboard, and the operations further include receiving, by computing device 2, an indication of a third gesture detected at the presence-sensitive display to select a second key of the graphical key. In such an example, outputting the replacement character string to replace the portion of the character string is further responsive to receiving, by computing device 2, an indication of a termination of at least the third gesture.

In one example, receiving the indication of the third gesture detected at the presence-sensitive display to select the second key of the graphical keyboard comprises receiving the indication of the third gesture while the first gesture is detected at the presence-sensitive display. In one example, the second key of the graphical keyboard comprises a key of the graphical keyboard associated with a space delimiter character. In one example, the second key of the graphical keyboard comprises a key of the graphical keyboard associated with a punctuation character.

In one example, receiving the indication of at least the portion of the second gesture to select the at least one key of the graphical keyboard comprises: receiving, by computing device 2 and while the first gesture is detected at the presence-sensitive display, an indication of a first portion of the second gesture to select a first key of the graphical keyboard; and receiving, by computing device 2, an indication of a second portion of the second gesture to select a second key of the graphical keyboard. In such an example, the second gesture comprises a continuous motion gesture detected at the presence-sensitive display, and the replacement character string is based at least in part on a first character associated with the first key and a second character associated with the second key. In one example, receiving the indication of the second portion of the second gesture to select the second key of the graphical keyboard comprises receiving the second portion of the second gesture while the first gesture is detected at the presence-sensitive display.

In one example, the operations further include: determining, by computing device 2 and based at least in part on the at least one key, one or more candidate words; outputting, by computing device 2 and for display at the presence-sensitive display, the one or more candidate words in the graphical user interface; and receiving, by computing device 2, an indication of a third gesture detected at the presence-sensitive display, the third gesture to select one of the one or more candidate words as a selected candidate word. In such an example, outputting the replacement character string to replace the portion of the character string comprises outputting the selected candidate word to replace the portion of the character string.

In one example, the character string included within the text display region comprises two or more words, receiving the indication of the first gesture detected at the presence-sensitive display at the location within the text display region comprises receiving the indication of the first gesture detected at the presence-sensitive display at a first location within the text display region, and selecting the at least the portion of the character string further comprises: determining, by computing device 2, a first distance between the first location and a second location associated with a first one of the two or more words; determining, by computing device 2, a second distance between the first location and a third location associated with a second one of the two or more words; and selecting, by computing device 2 and based at least in part on a comparison of the first distance and the second distance, the first one of the two or more words as the portion of the character string.

In one example, selecting the first one of the two or more words as the portion of the character string further comprises selecting the first one of the two or more words as the portion of the character string based at least in part on a determination, by computing device 2, that the first distance is less than the second distance. In one example, selecting the first one of the two or more words as the portion of the character string further comprises selecting the first one of the two or more words as the portion of the character string based at least in part on the at least one key of the graphical keyboard. In one example, selecting the first one of the two or more words as the portion of the character string based at least in part on the at least one key of the graphical keyboard comprises selecting the first one of the two or more words as the portion of the character string based at least in part on a comparison of a number of characters included in the first one of the two or more words with a number of keys of the at least one key. In one example, wherein selecting the first one of the two or more words as the portion of the character string further comprises selecting the first one of the two or more words as the portion of the character string based on a determination, by computing device 2, that at least one character of the first one of the two or more words corresponds to a character associated with at least one of the at least one key.

Figure 6:
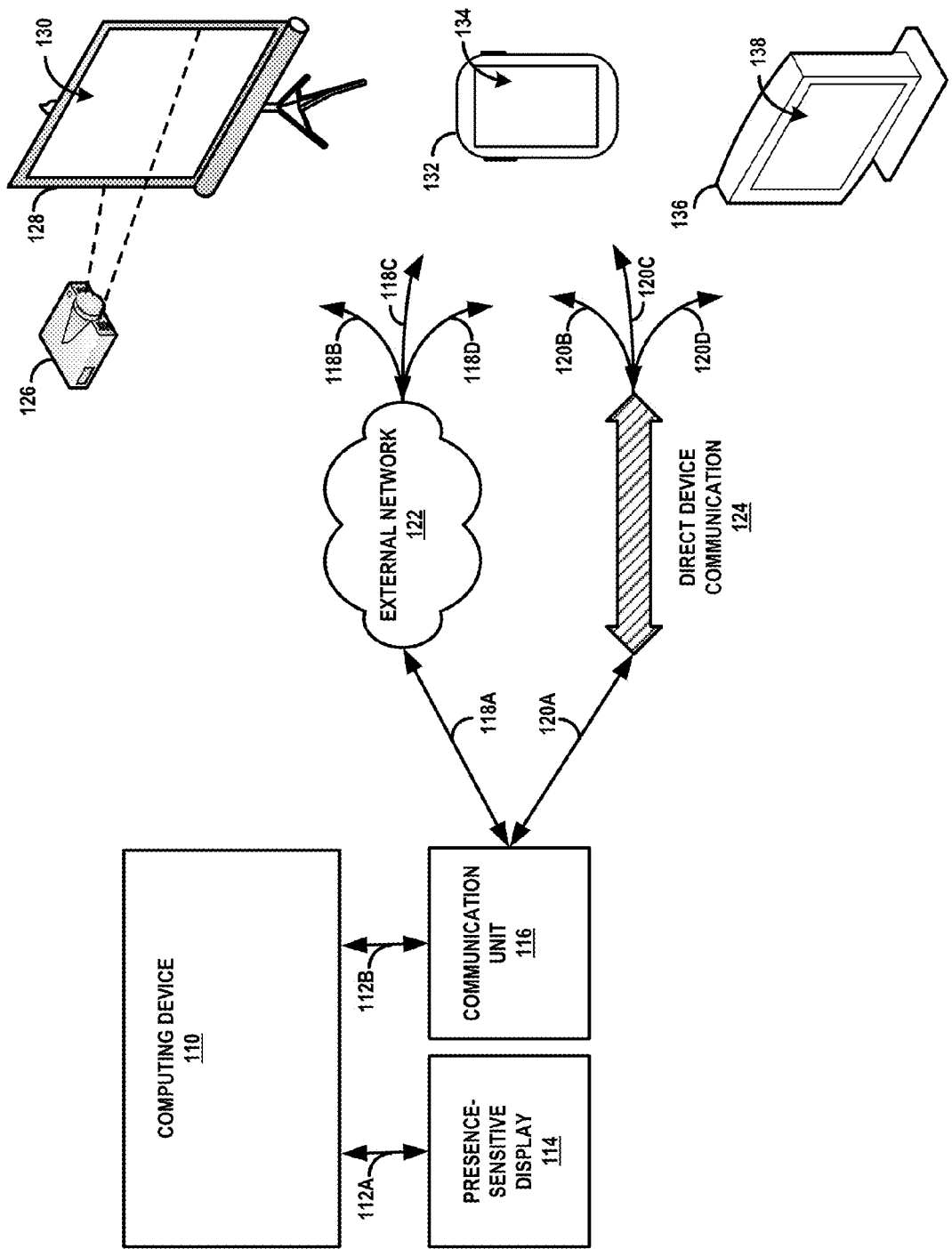
FIG. 6 is a block diagram illustrating an example computing device that outputs graphical content for display at a remote device, in accordance with one or more techniques of the present disclosure.

FIG. 6 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 6 includes a computing device 110, presence-sensitive display 114, communication unit 116, projector 126, projector screen 128, tablet device 132, and visual display device 136. Although shown for purposes of example in FIGS. 1 and 2 as a stand-alone computing device, a computing-device may, generally, be any component or system that includes a processor or other suitable computing environment for executing software instructions and, for example, need not include a presence-sensitive display.

As shown in the example of FIG. 6, computing device 110 may be a processor that includes functionality as described with respect to processor 40 in FIG. 2. In such examples, computing device 110 may be operatively coupled to presence-sensitive display 114 by a communication channel 112A, which may be a system bus or other suitable connection. Computing device 110 may also be operatively coupled to communication unit 116, further described below, by a communication channel 112B, which may also be a system bus or other suitable connection. Although shown separately as an example in FIG. 6, computing device 110 may be operatively coupled to presence-sensitive display 114 and communication unit 116 by any number of one or more communication channels.

In other examples, such as illustrated previously in FIGS. 1-2, computing device 110 may be a portable or mobile device such as mobile phones (including smart phones), laptop computers, etc. In some examples, computing device 110 may be a desktop computers, tablet computers, smart television platforms, cameras, personal digital assistants (PDAs), servers, mainframes, etc.

As shown in FIG. 6, computing device 110 may also include and/or be operatively coupled with communication unit 116. Communication unit 116 may include functionality of communication unit 44 as described in FIG. 2. Examples of communication unit 116 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 110 may also include and/or be operatively coupled with one or more other devices, e.g., input devices, output devices, memory, storage devices, etc. that are not shown in FIG. 6 for purposes of brevity and illustration.

FIG. 6 also illustrates a projector 126 and projector screen 128. Other such examples of projection devices may include electronic whiteboards, holographic display devices, and any other suitable devices for displaying graphical content. Projector 126 and project screen 128 may include one or more communication units that enable the respective devices to communicate with computing device 110. In some examples, the one or more communication units may enable communication between projector 126 and projector screen 128. Projector 126 may receive data from computing device 110 that includes graphical content. Projector 126, in response to receiving the data, may project the graphical content onto projector screen 128. In some examples, projector 126 may determine one or more user inputs (e.g., continuous gestures, multi-touch gestures, single-touch gestures, etc.) at projector screen using optical recognition or other suitable techniques and send indications of such user input using one or more communication units to computing device 110.

Projector screen 128, in some examples, may include a presence-sensitive display 130. Presence-sensitive display 130 may include a subset of functionality or all of the functionality of UI device 4 as described in this disclosure. In some examples, presence-sensitive display 130 may include additional functionality. Projector screen 128 (e.g., an electronic whiteboard), may receive data from computing device 110 and display the graphical content. In some examples, presence-sensitive display 130 may determine one or more user inputs (e.g., continuous gestures, multi-touch gestures, single-touch gestures, etc.) at projector screen 128 using capacitive, inductive, and/or optical recognition techniques and send indications of such user input using one or more communication units to computing device 110.

FIG. 6 also illustrates tablet device 132 and visual display device 136. Tablet device 132 and visual display device 136 may each include computing and connectivity capabilities. Examples of tablet device 132 may include e-reader devices, convertible notebook devices, hybrid slate devices, etc. Examples of visual display device 136 may include televisions, computer monitors, etc. As shown in FIG. 6, tablet device 132 may include a presence-sensitive display 134. Visual display device 136 may include a presence-sensitive display 138. Presence-sensitive displays 134, 138 may include a subset of functionality or all of the functionality of UI device 4 as described in this disclosure. In some examples, presence-sensitive displays 134, 138 may include additional functionality. In any case, presence-sensitive display 138, for example, may receive data from computing device 110 and display the graphical content. In some examples, presence-sensitive display 138 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 110.

As described above, in some examples, computing device 110 may output graphical content for display at presence-sensitive display 114 that is coupled to computing device 110 by a system bus or other suitable communication channel. Computing device 110 may also output graphical content for display at one or more remote devices, such as projector 126, projector screen 128, tablet device 132, and visual display device 136. For instance, computing device 110 may execute one or more instructions to generate and/or modify graphical content in accordance with techniques of the present disclosure. Computing device 110 may output the data that includes the graphical content to a communication unit of computing device 110, such as communication unit 116. Communication unit 116 may send the data to one or more of the remote devices, such as projector 126, projector screen 128, tablet device 132, and/or visual display device 136. In this way, processor 102 may output the graphical content for display at one or more of the remote devices. In some examples, one or more of the remote devices may output the graphical content at a presence-sensitive display that is included in and/or operatively coupled to the respective remote devices.

In some examples, computing device 110 may not output graphical content at presence-sensitive display 114 that is operatively coupled to computing device 110. In other examples, computing device 110 may output graphical content for display at both a presence-sensitive display 114 that is coupled to computing device 110 by communication channel 112A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 110 and output for display at presence-sensitive display 114 may be different than graphical content display output for display at one or more remote devices.

Computing device 110 may send and receive data using any suitable communication techniques. For example, computing device 110 may be operatively coupled to external network 122 using network link 118A. Each of the remote devices illustrated in FIG. 6 may be operatively coupled to network external network 122 by one of respective network links 118B, 118C, and 118D. External network 122 may include network hubs, network switches, network routers, etc., that are operatively inter-coupled thereby providing for the exchange of information between computing device 110 and the remote devices illustrated in FIG. 6. In some examples, network links 118A-118D may be Ethernet, ATM or other network connections. Such connections may be wireless and/or wired connections.

In some examples, computing device 110 may be operatively coupled to one or more of the remote devices included in FIG. 6 using direct device communication 124. Direct device communication 124 may include communications through which computing device 110 sends and receives data directly with a remote device, using wired or wireless communication. That is, in some examples of direct device communication 124, data sent by computing device 110 may not be forwarded by one or more additional devices before being received at the remote device, and vice-versa. Examples of direct device communication 124 may include Bluetooth, Near-Field Communication, Universal Serial Bus, WiFi, infrared, etc. One or more of the remote devices illustrated in FIG. 6 may be operatively coupled with computing device 110 by communication links 120A-120D. In some examples, communication links 118A-118D may be connections using Bluetooth, Near-Field Communication, Universal Serial Bus, infrared, etc. Such connections may be wireless and/or wired connections.

In accordance with techniques of the disclosure, computing device 110 may be operatively coupled to visual display device 136 using external network 122. Computing device 110 may output a graphical user interface including a text display region and a graphical keyboard for display at presence-sensitive display 138. For instance, computing device 110 may send data that includes a representation of the graphical user interface to communication unit 116. Communication unit 116 may send the data that includes the representation of the graphical user interface to visual display device 136 using external network 122. Visual display device 136, in response to receiving the data using external network 122, may cause presence-sensitive display 138 to output the graphical user interface. In response to a user performing a first gesture detected at presence-sensitive display 138 at a location within the text display region, visual display device 136 may send an indication of the first gesture to computing device 110 using external network 122. Communication unit 116 may receive the indication of the first gesture, and send the indication of the first gesture to computing device 110. Similarly, in response to a user performing at least a portion of a second gesture detected at presence-sensitive display 138, while the first gesture is detected at presence-sensitive display 138, to select at least one key of the graphical keyboard, visual display device 136 may send an indication of the second gesture to computing device 110 using external network 122. Communication unit 116 may receive the indication of the second gesture, and send the indication of the second gesture to computing device 110.s Computing device 110 may select, based at least in part on the location within the text display region, at least a portion of a character string included in the text display region. Computing device 110 may output, responsive to receiving an indication of a termination of at least the second gesture and based at least in part on the at least one key of the graphical keyboard, a replacement character string for display within the text display region to replace the portion of the character string. Computing device 110 may send data that includes the candidate character string to communication unit 116, which in turn sends the data to visual display device 136 using external network 122. Upon receiving the data, visual display device 136 may cause presence-sensitive display 138 to display the candidate character string. In this way, computing device 110 may output the candidate word for display at presence-sensitive screen 138, in accordance with techniques of the disclosure.

Techniques described herein may improve the ease and accuracy with which a user may interact with a computing device to enter text using a graphical keyboard. According to techniques of this disclosure, a computing device may enable a user to quickly correct one or more portions of displayed text (e.g., a word) without affecting characters included in later words. For example, according to various techniques, text entry using a graphical keyboard, such as a gesture-based keyboard, may be performed a word at a time. As such, mid-word errors may go unnoticed by the user. Because of such mid-word errors, a backspace key may be more likely to be used to erase subsequently entered characters that are actually desired to be displayed. Techniques described herein may enable a user to quickly correct such mid-word, or mid-sentence errors without affecting characters included in later words (e.g., characters that follow the characters to be replaced). Moreover, techniques of this disclosure may enable a user to use one hand to select a portion of text to be replaced, thereby leaving the other hand free to select replacement text (e.g., using a gesture-based keyboard).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
outputting, by a computing device and for display, a graphical user interface including a text display region and a graphical keyboard comprising a plurality of character keys, wherein a visual indicator is positioned at a first location of the text display region;
responsive to receiving a first gesture detected at a second location of the text display region, repositioning, by the computing device, the visual indicator to the second location of the text display region;
selecting, by the computing device and based at least in part on the first gesture, at least a portion of a character string displayed within the text display region;
responsive to receiving a second gesture to select at least one character key from the plurality of character keys, outputting, by the computing device, for display within the text display region, a replacement character string that replaces at least the portion of the character string, the replacement character string being based at least in part on the at least one character key; and
responsive to outputting the replacement string and without receiving a third gesture to reposition the visual indicator, automatically repositioning, by the computing device, the visual indicator to the first location.

2. The method of claim 1, wherein the visual indicator comprises at least one of a cursor and a carat.

3. The method of claim 1, wherein the first location corresponds to a location at an end of the character string.

4. The method of claim 1, wherein automatically repositioning the visual indicator to the first location is further responsive to receiving, by the computing device, an indication of a termination of the second gesture.

5. The method of claim 1, wherein outputting the replacement character string for display within the text display region is further responsive to receiving, by the computing device, an indication of a termination of the second gesture.

6. The method of claim 1, wherein the portion of the character string comprises one or more characters bounded by one or more of a space delimiter character and a punctuation character.

7. The method of claim 1, wherein the at least one character key is a first character key, the method further comprising:
receiving, by the computing device, a fourth gesture to select at least a second character key from the plurality of character keys,
wherein outputting the replacement character string to replace at least the portion of the character string is further responsive to receiving, by the computing device, an indication of a termination of at least the fourth gesture.

8. The method of claim 7, wherein receiving the fourth gesture to select the second character key from the plurality of character keys comprises receiving the fourth gesture while the first gesture is detected at an input device.

9. The method of claim 7, wherein the second character key from the plurality of character keys comprises a character key from the plurality of character keys associated with a space delimiter character.

10. The method of claim 7, wherein the second character key from the plurality of character keys comprises a character key from the plurality of character keys associated with a punctuation character.

11. The method of claim 1, further comprising:
determining, by the computing device and based at least in part on the at least one character key, one or more candidate words;
outputting, by the computing device and for display, the one or more candidate words in the graphical user interface; and
receiving, by the computing device, a fourth gesture detected at an input device, the fourth gesture to select one of the one or more candidate words as a selected candidate word, wherein outputting the replacement character string to replace at least the portion of the character string comprises outputting the selected candidate word to replace at least the portion of the character string.

12. A computer-readable storage medium encoded with instructions that, when executed, cause at least one processor to:
output for display, a graphical user interface including a text display region and a graphical keyboard comprising a plurality of character keys, wherein a visual indicator is positioned at a first location of the text display region;
responsive to receiving a first gesture detected at a second location of the text display region, reposition the visual indicator to the second location of the text display region;
select, based at least in part on the first gesture detected at the second location of the text display region, at least a portion of a character string included in the text display region;
responsive to receiving a second gesture to select at least one character key from the plurality of character keys, output, for display within the text display region a replacement character string that replaces at least the portion of the character string, the replacement character string being based at least in part on the at least one character key; and
responsive to outputting the replacement string and without receiving a third gesture to reposition the visual indicator, automatically reposition the visual indicator to the first location.

13. The computer-readable storage medium of claim 12, wherein the visual indicator comprises at least one of a cursor and a carat.

14. The computer-readable storage medium of claim 12, wherein automatically repositioning the visual indicator to the first location is further responsive to receiving an indication of a termination of the second gesture.

15. The computer-readable storage medium of claim 12, wherein outputting the replacement character string for display within the text display region is further responsive to receiving of a termination of the second gesture.

16. A device comprising:
at least one processor; and
at least one module operable by the at least one processor to:
output for display, a graphical user interface including a text display region and a graphical keyboard comprising a plurality of character keys, wherein a visual indicator is positioned at a first location of the text display region;
responsive to receiving a first gesture detected at a second location of the text display region, reposition the visual indicator to the second location of the text display region;
select, based at least in part on the first gesture detected at the second location of the text display region, at least a portion of a character string displayed within the text display region;
responsive to receiving a second gesture to select at least one character key from the plurality of character keys output, for display within the text display region, a replacement character string that replaces at least the portion of the character string, the replacement character string being based at least in part on the at least one character key; and
responsive to outputting the replacement string for display and without receiving a third gesture to reposition the visual indicator, automatically reposition the visual indicator to another location of the text display region.

17. The device of claim 16, wherein the visual indicator comprises at least one of a cursor and a carat.

18. The device of claim 16, wherein automatically repositioning the visual indicator to another location is further responsive to receiving an indication of a termination of the second gesture.

19. The device of claim 16, wherein outputting the replacement character string for display within the text display region is further responsive to receiving an indication of a termination of the second gesture.

20. The device of claim 16, wherein the at least one character key is a first character key, wherein the at least one module is operable by the at least one processor to:
receive a fourth gesture to select at least a second character key from the plurality of character keys,
wherein outputting the replacement character string to replace at least the portion of the character string is further responsive to receiving an indication of a termination of at least the fourth gesture.

* * * * *